United States Patent [19]

Berman

[11] Patent Number: 5,665,917

[45] Date of Patent: Sep. 9, 1997

[54] METHOD FOR CONSTRUCTING SUPERSONIC SHOCK-WAVE VIBRATOR DEVICES FOR APPLYING VIBRATORY FORCE FOR MEASURING PURPOSES OR TESTING PURPOSES BY USING CAVITATING SPACE

[76] Inventor: Stephen Bruce Berman, 1601 Lipan Trail, Austin, Tex. 78733

[21] Appl. No.: 557,942

[22] Filed: Nov. 14, 1995

[51] Int. Cl.$^6$ ............................................. G01M 7/02
[52] U.S. Cl. .................................................... 73/662
[58] Field of Search ........................... 73/590, 592, 52, 73/54, 28, 54.41, 61.75, 61.49, 586, DIG. 1

[56] References Cited

U.S. PATENT DOCUMENTS

| | | | |
|---|---|---|---|
| 3,608,715 | 9/1971 | Snder | 73/590 |
| 4,333,796 | 6/1982 | Flynn . | |
| 4,736,130 | 4/1988 | Puskas | 73/647 |
| 4,991,151 | 2/1991 | Dory | 73/625 |
| 5,074,150 | 12/1991 | Tirelli | 73/590 |
| 5,257,545 | 11/1993 | Au-Yang | 73/597 |

OTHER PUBLICATIONS

Robert A. Hiller and Bradleya P. Barber, "Producing Light from a Bubble of Air," Scientific American, Feb. 1995 at p. 96.
Seth J. Putterman, "Sonoluminescence: Sound unto Light," Scientific American, Feb. 1995 at p. 46.
Jocelyn Kaiser, "Inferno in a Bubble" Science News, Apr. 25, 1995, at p. 267.
Charles C. Church, "A Theoretical Study of Cavitation Generated by an Extracorporeal Shock Wave Lithotripter," Journal Acoustical Society of America vol. 86, No. 1, Jul. 1989 at p. 215.

*Primary Examiner*—Christine K. Oda
*Attorney, Agent, or Firm*—David G. Henry

[57] ABSTRACT

A method of constructing vibrator devices particularly adapted for producing and applying vibratory forces to bodies or test bodies for any measuring or any testing purposes by using cavitating spaces within fluids within housings which are driven by piezoelectric drivers to thereby produce supersonic shock-wave vibratory forces which are coupled by any gas interfaces or any liquid interfaces or any solid interfaces to bodies or test bodies is presently disclosed.

2 Claims, 2 Drawing Sheets

Prior Art

METHOD FOR CONSTRUCTING SUPERSONIC SHOCK-WAVE VIBRATOR DEVICES FOR APPLYING VIBRATORY FORCE FOR MEASURING PURPOSES OR TESTING PURPOSES BY USING CAVITATING SPACE

BACKGROUND OF THE INVENTION

I. Field of the Invention

This invention pertains to the field of methods of producing vibrator devices particularly adapted for producing and applying vibratory forces to one or more bodies or one or more test bodies for any measuring purposes or any testing purposes.

II. Description of the Prior Art

Methods or devices used for subjecting one or more bodies or one or more test bodies to vibratory forces for useful applications such as determining qualities or for determining characteristics or for determining conditions or for examination or for inspection or for material characterization or for the imaging of any internal or any external structures have been disclosed in the prior art or improved by disclosures in the prior art that include the use of methods or devices to construct or improve the construction of vibrator devices particularly adapted for producing and applying vibratory forces, or the use of methods or devices to construct or improve the construction of devices for coupling of the vibratory forces to one or more bodies or one or more test bodies, or the use of methods or devices to construct or improve the construction of devices for the temporal control of vibrator devices, or the use of methods or devices to construct or improve the construction of devices for the displaying of information about the temporal control of vibrator devices, or the use of methods or devices to construct or improve the construction of devices for the recording of information about the temporal control of vibrator devices, or the use of methods or devices to construct or improve the construction of devices for the analyzing of information about the temporal control of vibrator devices, or the use of methods or devices to construct or improve the construction of devices for the displaying of analyzed information about the temporal control of vibrator devices, or the use of methods or devices to construct or improve the construction of devices for the recording of analyzed information about the temporal control of vibrator devices, or the use of methods or devices to construct or improve the construction of devices for the spatial control of vibrator devices, or the use of methods or devices to construct or improve the construction of devices for the displaying of information about the spatial control of vibrator devices, or the use of methods or devices to construct or improve the construction of devices for the recording of information about the spatial control of vibrator devices, or the use of methods or devices to construct improve the construction of devices for the analysis of information about the spatial control of vibrator devices, or the use of methods or devices to construct or improve the construction of devices for the display of analyzed information about the spatial control of vibrator devices, or the use of methods or devices to construct or improve the construction of devices for the recording of analyzed information about the spatial control of vibrator devices, or the use of methods or devices to construct or improve the construction of devices for the receiving and transducing of one or more vibratory forces that have been propagated by any transmission through or any reflection from or any refraction by one or more bodies or one or more test bodies, or the use of methods or devices to construct or improve the construction of devices for the display of the received and transduced one or more vibratory forces, or the use of methods or devices to construct or improve the construction of devices for the recording of the received and transduced one or more vibratory forces, or the use of methods or devices to construct or improve the construction of devices for the analysis of the received and transduced one or more vibratory forces, or the use of methods or devices to construct or improve the construction of devices for the display of the one or more analyzed vibratory forces, or the use of methods or devices to construct or improve the construction of devices for the recording of the one or more analyzed vibratory forces.

Previously disclosed methods or devices to construct or improve the construction of devices for vibrator devices particularly adapted for producing and applying vibratory forces to one or more bodies or one or more test bodies for test purposes or measurement purposes have used methods or devices that produce and apply vibratory forces that are not supersonic shock-waves.

Methods for construction of devices that produce supersonic shock-wave vibratory forces by using cavitating spaces within fluid water within glass housings driven by piezoelectric drivers have been described in print (Scientific American 272:2 February, 1995 pages 46–51 and 96–98/ Science News 147:17 Apr. 29, 1995 pages 266–267).

The art related problem of improving vibrator devices particularly adapted for producing and applying vibratory forces to one or more bodies or one or more test bodies for any test purposes or any measuring purposes is solved by the presently disclosed method of utilizing vibrator devices that produce vibratory forces that are supersonic shock-waves.

SUMMARY OF THE INVENTION

The object of the presently disclosed invention is to provide a method of constructing vibrator devices particularly adapted for producing and applying vibratory forces to one or more bodies or one or more test bodies for measuring purposes or testing purposes.

The presently disclosed invention reveals the method of using a cavitating spaces within fluids within housings to produce supersonic shock-wave vibratory forces to be applied by coupling to one or more bodies or one or more test bodies for measuring purposes or test purposes.

The general idea or substance of the presently disclosed invention is that one or more supersonic shock-wave vibrations are produced by one or more cavitating spaces within one or more fluids within one or more housings.

Vibratory force that is a supersonic shock-wave is transmitted through or reflected from or refracted by bodies or test bodies in a manner unlike vibratory force that is not a supersonic shock-wave.

Supersonic shock-wave vibratory force is a limiting form of vibratory force.

Supersonic shock-wave vibration is of a duration that allows supersonic shock-wave vibratory forces to be produced singularly or in trains at any rate up to and including ultrasonic rates.

The method of utilizing one or more supersonic shock-wave vibratory forces produced by one or more cavitating spaces within one or more fluids within one or more housings is therefore an improvement of the art of methods for producing vibrator devices that are particularly adapted for producing and applying vibratory forces for any testing purposes or any measuring purposes.

DETAILED DESCRIPTION OF THE INVENTION

Figure 1:
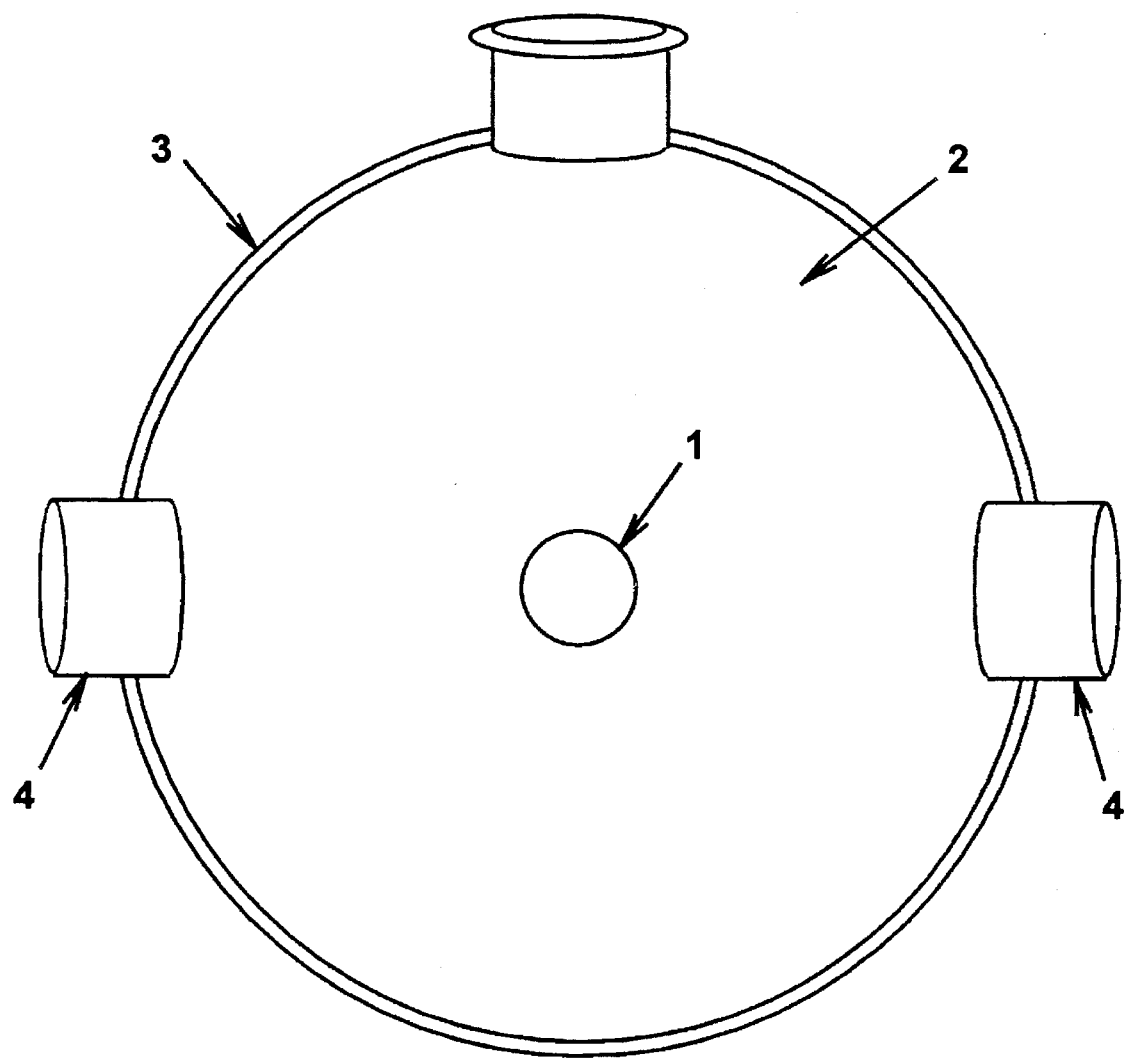
FIG. 1 is a drawing of a preferred embodiment of a vibrator constructed by the disclosed method and it shows a cavitating space within fluid water within a glass round bottom flask housing driven by two piezoelectric drivers.

One or more vibrator devices are constructed by methods or using devices or with materials known to ones experienced in the prior arts with one or more cavitating spaces within one or more fluids within one or more housings driven by one or more piezoelectric drivers to thereby produce one or more supersonic shock-wave vibratory forces.

The vibrator devices may be further equipped for any measuring-purposes or any testing purposes with;

One or more devices which are constructed by methods or using devices or with materials known to ones experienced in the prior arts that provide temporal control of the cavitating spaces.

One or more devices which are constructed by methods or using devices or with materials known to ones experienced in the prior arts that display information about the temporal control of the cavitating spaces.

One or more devices which are constructed by methods or using devices or with materials known to ones experienced in the prior arts that record information about the temporal control of the cavitating spaces.

One or more devices which are constructed by methods or using devices or with materials known to ones experienced in the prior arts that display recorded information about the temporal control of the cavitating spaces.

One or more devices which are constructed by methods or using devices or with materials known to ones experienced in the prior arts that analyze information about the temporal control of the cavitating spaces.

One or more devices which are constructed by methods or using devices or with materials known to ones experienced in the prior arts that display analyzed information about the temporal control of the cavitating spaces.

One or more devices which are constructed by methods or using devices or with materials known to ones experienced in the prior arts that record analyzed information about the temporal control of the cavitating spaces.

One or more devices which are constructed by methods or using devices or with materials known to ones experienced in the prior arts that provide spatial control of the cavitating spaces.

One or more devices which are constructed by methods or using devices or with materials known to ones experienced in the prior arts that display information about the spatial control of the cavitating spaces.

One or more devices which are constructed by methods or using devices or with materials known to ones experienced in the prior arts that record information about the spatial control of the cavitating spaces.

One or more devices which are constructed by methods or using devices or with materials known to ones experienced in the prior arts that display recorded information about the spatial control of the cavitating spaces.

One or more devices which are constructed by methods or using devices or with materials known to ones experienced in the prior arts that analyze information about the spatial control of the cavitating spaces.

One or more devices which are constructed by methods or using devices or with materials known to ones experienced in the prior arts that display analyzed information about the spatial control of the cavitating spaces.

One or more devices which are constructed by methods or using devices or with materials known to ones experienced in the prior arts that record analyzed information about the spatial control of the cavitating spaces.

One or more devices which are constructed by methods or using devices or with materials known to ones experienced in the prior arts that couple the produced one or more supersonic shock-wave vibratory forces to one or more bodies or one or more test bodies by any gas interfaces or any liquid interfaces or any solid interfaces.

One or more devices which are constructed by methods or using devices or with materials known to ones experienced in the prior arts for receiving and transducing at any times or any spatial locations one or more supersonic shock-wave vibratory forces that have been coupled to and propagated by any transmission through or any reflection from or any refraction by one or more bodies or one or more test bodies.

One or more devices which are constructed by methods or using devices or with materials known to ones experienced in the prior arts for display of information about received and transduced supersonic shock-wave vibratory forces that have been propagated by any transmission through or any reflection from or any refraction by one or more bodies or one or more test bodies.

One or more devices which are constructed by methods or using devices or with materials known to ones experienced in the prior arts for recording information about received and transduced supersonic shock-wave vibratory forces that have been propagated by any transmission through or any reflection from or any refraction by one or more bodies or one or more test bodies.

One or more devices which are constructed by methods or using devices or with materials known to ones experienced in the prior arts for display of recorded information about received and transduced supersonic shock-wave vibratory forces that have been propagated by any transmission through or any reflection from or any refraction by one or more bodies or one or more test bodies.

One or more devices which are constructed by methods or using devices or with materials known to ones experienced in the prior arts for analysis of information about received and transduced supersonic shock-wave vibratory forces that have been propagated by any transmission through or any reflection from or any refraction by one or more bodies or one or more test bodies.

One or more devices which are constructed by methods or using devices or with materials known to ones experienced in the prior arts for display of analyzed information about received and transduced supersonic shock-wave vibratory forces that have been propagated by any transmission through or any reflection from or any refraction by one or more bodies or one or more test bodies.

One or more devices which are constructed by methods or using devices or with and materials known to ones experienced in the prior arts for recording of analyzed information about received and transduced supersonic shock-wave vibratory forces that have been propagated by any transmission through or any reflection from or any refraction by one or more bodies or one or more test bodies.

FIG. 1 is a drawing of a preferred embodiment of a vibrator constructed by the presently disclosed method and it shows the use of a cavitating space 1 within fluid water 2 within a glass round bottom flask housing 3 being driven by two piezoelectric drivers 4.

Figure 2:
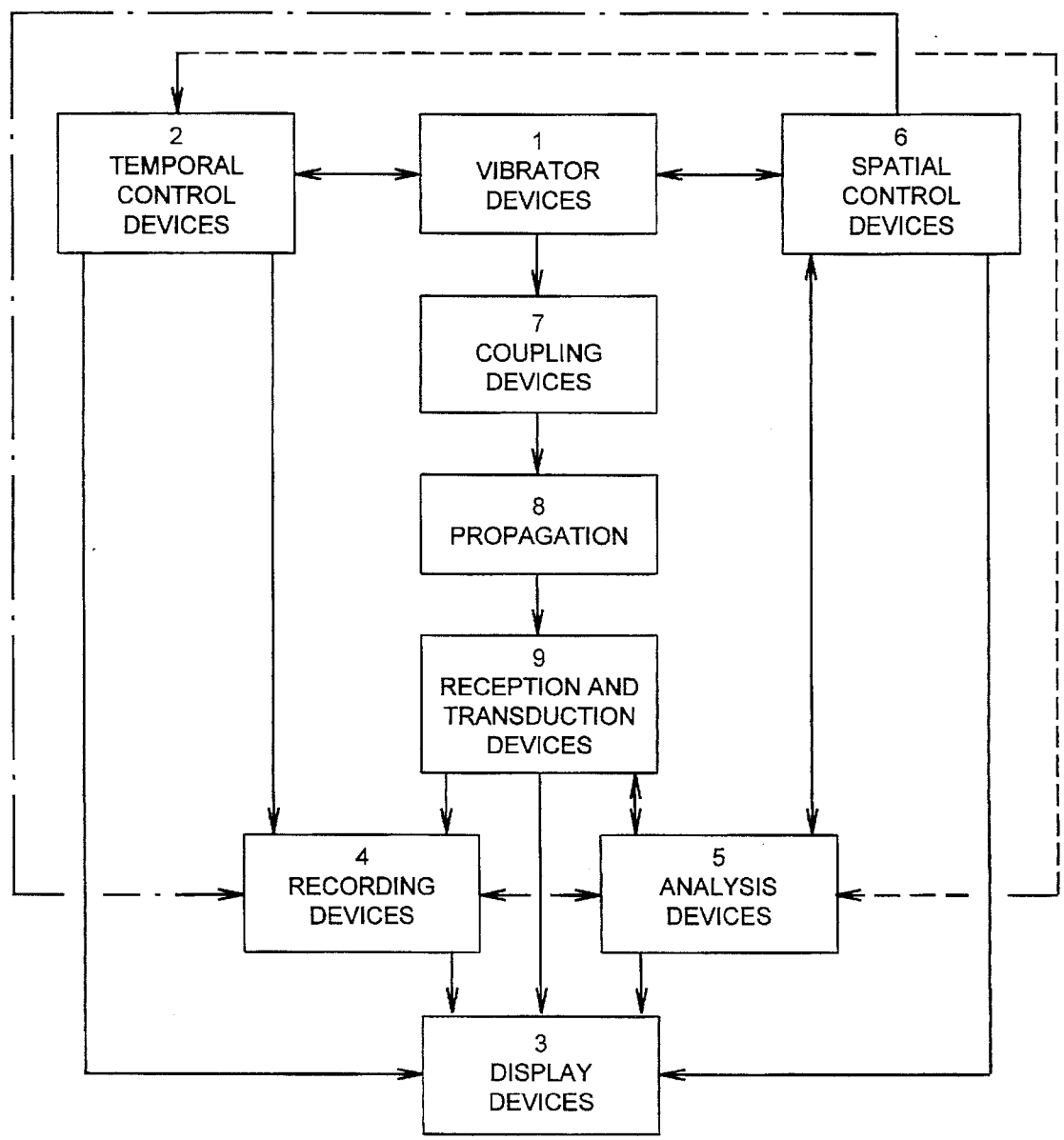
FIG. 2 is a functional block diagram of a utilization of vibrator devices constructed using the disclosed method of using cavitating spaces within fluids within housings driven by piezoelectric drivers to produce supersonic shock-wave vibratory forces which are then applied by coupling to bodies or test bodies after which the transmitted or reflected or refracted vibratory force is received and transduced and the information used for measuring purposes or testing purposes by any display, recording, analysis, display of analysis or recording of analysis. Also shown are devices for temporal control and spatial control of the cavitating spaces and the display, recording, analysis, display of analysis and recording of analysis of information about the temporal and spatial control.

FIG. 2 is a functional block diagram illustrating the presently disclosed method of using for any measuring purposes or any testing purposes one or more vibrator devices constructed with one or more cavitating spaces within one or more fluids within one or more housings that are driven by one or more piezoelectric drivers to produce one or more supersonic shock-wave vibratory forces 1, and with said produced supersonic shock-wave vibratory forces being controlled by one or more temporal control devices 2, with said temporal control devices communicating information about the temporal control of the cavitating spaces to display devices 3, with said temporal control devices communicating information about the temporal control of the cavitating spaces to recording devices 4, with said recording devices communicating with display devices 3, with said temporal control devices communicating information about the temporal control of the cavitating spaces with analysis devices 5, with said analysis devices communicating with display devices 3, with said analysis devices communicating with recording devices 4, and with said produced supersonic shock-wave vibratory forces being controlled by one or more spatial control devices 6, with said spatial control devices communicating information about the spatial control of the cavitating space with display devices 3, with said spatial control devices communicating information about the spatial control of the cavitating spaces with recording devices 4, with said recording devices communicating with display devices 3, with said spatial control devices communicating information about the spatial control of the cavitating spaces with analysis devices 5, with said analysis devices communicating with display devices 3, with said analysis devices communicating with recording devices 4, and with said produced supersonic shock-wave vibratory forces being coupled to one or more bodies or one or more test bodies by any gas interfaces or any liquid interfaces or any solid interfaces 7, and with said coupled supersonic shock-wave vibratory forces propagating by any transmission through or any reflection from or any refraction by one or more bodies or one or more test bodies 8, and with said propagated supersonic shock-wave forces then being received and transduced by one or more receiving transducer devices at any times or any spatial locations 9, with said supersonic shock-wave vibratory force receiving transducer devices communicating with display devices 3, with said supersonic shock-wave vibratory force receiving transducer devices communicating with recording devices 4, with said recording devices communicating with display devices 3, with said supersonic shock-wave vibratory force receiving transducer devices communicating with analysis devices 5, with said analysis devices communicating with display devices 3, with said analysis devices communicating with recording devices 4.

What I claim as my invention is:

1. A method of applying vibratory forces to a body comprising the steps of:

passing sound waves through a vibratory device, said vibratory device comprising:
a housing; and
fluid located within said housing;

allowing a cavitating space to form, expand and collapse within said fluid; and applying the vibratory force resulting from the collapse of the cavitating space to a body.

2. The method according to claim 1 wherein the sound waves are generated by applying one or more piezoelectric drivers to said housing.

* * * * *